United States Patent
Johnson et al.

(10) Patent No.: US 10,883,525 B2
(45) Date of Patent: Jan. 5, 2021

(54) FIXING DEVICE

(71) Applicant: Flexistrut Building Services PTY LTD, Cheltenham (AU)

(72) Inventors: Lindsay Edward Johnson, Somerville (AU); Adam David McLeod, McCrae (AU)

(73) Assignee: Flexistrut Building Services PTY LTD, Cheltenham (AU)

( * ) Notice: Subject to any disclaimer, the term of this patent is extended or adjusted under 35 U.S.C. 154(b) by 27 days.

(21) Appl. No.: 16/322,225

(22) PCT Filed: Aug. 1, 2017

(86) PCT No.: PCT/AU2017/050799
§ 371 (c)(1),
(2) Date: Jan. 31, 2019

(87) PCT Pub. No.: WO2018/023154
PCT Pub. Date: Feb. 8, 2018

(65) Prior Publication Data
US 2019/0186517 A1 Jun. 20, 2019

(30) Foreign Application Priority Data

Aug. 2, 2016 (AU) .............................. 2016903032

(51) Int. Cl.
| *F16B 5/02* | (2006.01) |
| *F16B 39/28* | (2006.01) |
| *F16B 37/04* | (2006.01) |
| *F16B 33/00* | (2006.01) |
| *F16B 39/282* | (2006.01) |

(52) U.S. Cl.
CPC .......... *F16B 5/0266* (2013.01); *F16B 37/046* (2013.01); *F16B 39/282* (2013.01); *F16B 33/002* (2013.01)

(58) Field of Classification Search
CPC .... F16B 5/0266; F16B 37/046; F16B 39/282; F16B 33/002
See application file for complete search history.

(56) References Cited

U.S. PATENT DOCUMENTS

| 1,956,846 | A | * | 5/1934 | Williams | ................ F16B 39/24 411/138 |
| 4,004,486 | A | * | 1/1977 | Schenk | ................. F16B 5/0266 411/16 |
| 5,904,460 | A | | 5/1999 | Kawabata | |

(Continued)

FOREIGN PATENT DOCUMENTS

| DE | 29513990 U1 | 10/1995 |
| DE | 102006052400 A1 | 4/2008 |

(Continued)

OTHER PUBLICATIONS

DE 102006052400; Schneider et al.; Fastening Device for COnnecting Components; EPO Machine Translation; pp. 1-6; Apr. 24, 2020.*

*Primary Examiner* — Bayan Salone
(74) *Attorney, Agent, or Firm* — Larson & Anderson, LLC

(57) ABSTRACT

The present invention relates to a fixing device and related methods. In particular it relates to a fixing device for connecting components, such as components of 5 structural support systems, and related methods.

15 Claims, 16 Drawing Sheets

(56) References Cited

U.S. PATENT DOCUMENTS

| | | | | |
|---|---|---|---|---|
| 7,073,995 B2 * | 7/2006 | Herb | ................... | F16B 37/046 |
| | | | | 411/85 |
| 8,070,404 B1 * | 12/2011 | Schluter | ............... | F16B 39/282 |
| | | | | 411/368 |
| 2004/0165947 A1 * | 8/2004 | Herb | ................... | F16B 37/046 |
| | | | | 403/374.3 |
| 2010/0254753 A1 | 10/2010 | Mulholland | | |
| 2017/0082136 A1 * | 3/2017 | Nagashima | ............ | F16B 39/34 |

FOREIGN PATENT DOCUMENTS

| | | | | |
|---|---|---|---|---|
| DE | 102009018362 A1 | | 11/2010 | |
| DE | 102006052400 B4 * | | 9/2012 | ............... F16B 5/02 |
| GB | 1378836 A | | 12/1974 | |
| GB | 2481206 A | | 12/2011 | |
| GB | 2481206 B * | | 5/2014 | ........... F16B 37/041 |

\* cited by examiner

FIXING DEVICE

FIELD OF THE INVENTION

The present invention relates to a fixing device and related methods. In particular it relates to a fixing device for connecting components, such as components of structural support systems, and related methods.

BACKGROUND OF THE INVENTION

Various types of fixing devices are used for connecting components in numerous applications. A common fixing device is a standard hex nut and hex head bolt assembly, commonly used in construction and fabrication and numerous other domestic and industrial applications. For example, nuts and bolts are commonly used in structural support systems, including framing, scaffolding, racking and piping systems. In these and other applications, often it is necessary to connect components where access to the rear of the components is restricted. A problem with a nut and bolt assembly is that slippage of the nut while torqueing the bolt, or vice versa, may occur. In restricted access applications, access to the head or nut to apply a counter-rotation force may be difficult or impossible, and it may not be possible to sufficiently torque the assembly.

A modified nut and bolt fixing device is described in German patent application No. 102006052400. The device generally consists of a threaded rod with a head, a fastening element and a hex nut. For securing components the head is placed at a back face of the components and the fastening element and hex nut are tightened to the front face. Certain disadvantages remain with this device. For example, slippage of the head while securing the device may still occur. The device may be provided with a slit for a flathead screwdriver to help minimise this slippage; however this often requires two-handed installation while juggling the required tools. Installation may thus be finicky, difficult and time-consuming. Further, the exposed profile of the device at the front face of the components includes protruding threaded rod, which may constitute a safety and/or snagging hazard.

It is an object of the present invention to overcome, or at least alleviate, one or more of the difficulties or deficiencies associated with the prior art.

SUMMARY OF THE INVENTION

In a first aspect, the present invention provides a fixing device for connecting components, said fixing device including:
 a threaded rod optionally having a head,
 one or more fasteners,
 a retaining element, and
 a biasing element:
wherein the retaining element is positioned on the threaded rod between the head and a fastener or between two fasteners, and wherein the biasing element biases the retaining element towards the head or a fastener.

The fastener may be any element which has a fastening capability with the threaded rod. Preferably, the fastener is a nut, such that it includes a threaded bore for threadably receiving the threaded rod. The nut may include, for example, a hex nut, square nut, lock nut, or wing nut, which may be with or without, for example, a flange, cap, slot or insert (e.g. nylon). The nut may also include a fixing nut. As used herein, the term "fixing nut" is intended to mean a nut that includes one or more protrusions for biting into a component.

In a preferred embodiment, the fastener may be a nut including a base and an elevation. The elevation may extend from the base by one or more sidewalls. The elevation may extend from the base by an amount which is the same or less than the combined thickness of the components to be connected. The general profile of the elevation when viewed down the axis of the threaded bore may be smaller than that of the base, such that the base includes one or more shelves about the elevation. For example, the base may include one shelf which extends substantially all around the elevation, or one shelf which extends about a portion of the elevation. The base may also include two or more shelves extending about a portion(s) of the elevation. The shelves may each independently extend by about the same amount, or may independently be different sizes. The angle between the shelf or shelves of the base and the sidewalls of the elevation is not particularly limited, but may generally be about 90°. The threaded bore may be formed through both the base and the elevation, or may be formed through only the base.

In embodiments where the threaded bore is formed through both the base and the elevation of the nut, the threaded bore may be formed approximately centrally through one or both of the base and the elevation, or offset in one or both of the base and the elevation in one or more directions. The base may include two shelves extending about opposing sides of the elevation, such that the profile of the nut is substantially oblong in shape when viewed down the axis of the threaded bore. The general shape of the profile of the elevation when viewed down the axis of the threaded bore is not particularly limited; for example, it may be substantially square, circular, elliptical, rectangular etc., or irregular.

In embodiments where the threaded bore is formed through only the base of the nut, the threaded bore may be formed approximately centrally through the base, or offset in one or more directions. The elevation may extend from the base in substantially the same direction as the axis of the threaded bore. The elevation may also extend from the base at a position proximal or distal to the periphery of the threaded bore. The elevation may substantially, but not completely, encircle the threaded bore, or it may extend from alongside a portion of the periphery of the threaded bore, whether the elevation is proximal or distal thereto. The general shape of the profile of the elevation is not particularly limited; for example, it may be substantially square, horse-shoe, circular, elliptical, rectangular etc., or irregular. A second or more elevations may also be included, which may be as substantially described in the foregoing. When two or more elevations are included, preferably each extends from the base in generally the same direction from positions proximal to, and at opposite sides of, the periphery of the threaded bore.

The fixing nut may be a nut including a base and an elevation as hereinbefore described, and include one or more protrusions for biting into a component. The location of the one or more protrusions for biting into a component is not particularly limited. For example, the one or more protrusions may adjoin the base and the elevation, more specifically independently adjoin a shelf of the base and side wall of the elevation. Alternatively, one or more protrusions may protrude from the base alone, in substantially the same direction as the elevation(s).

In one particularly preferred embodiment, the nut may be a fixing nut and may include the threaded bore formed approximately centrally through both the base and the elevation. The base preferably includes two shelves extending about opposing sides of the elevation, such that the general profile of the nut is substantially oblong in shape when viewed down the axis of the threaded bore. The general profile of the elevation when viewed down the axis of the threaded bore is preferably substantially square in shape. The one or more protrusions for biting into a component preferably includes two protrusions, each adjoining a shelf and side wall on opposing sides of the threaded bore.

In another particularly preferred embodiment, the nut is not a fixing nut. Even more preferably, the nut is a hex nut.

In general, the head may be much the same as a nut, including a fixing nut, as hereinbefore described, except that instead of a threaded bore, the head includes a threaded rod. The head is described in further detail in the following.

The head may generally be any element of the threaded rod which juts out in at least one direction beyond the circumference of the threaded rod. The head may include, for example, a hex head, square head, flat head, oval head, pan head, round head, truss head, socket cap head or button head and the like, which may be with or without, for example, a flange, cap, slot, washer, chamfer or cutting, etc. The head may be integral with the threaded rod, such that together the head and the threaded rod form a bolt. The head may also include a fixing head. As used herein, the term "fixing head" is intended to mean a head that includes one or more protrusions for biting into a component.

The head may also be described as including a base and an elevation. The elevation may extend from the base by one or more side walls. The elevation may extend from the base by an amount which is the same or less than the combined thickness of the components to be connected. The general profile of the elevation when viewed down the axis of the threaded rod may be smaller than that of the base, such that the base includes one or more shelves about the elevation. For example, the base may include one shelf which extends substantially all around the elevation, or one shelf which extends about a portion of the elevation. Alternatively, the base may include two or more shelves extending about a portion(s) of the elevation. The shelves may each independently extend by about the same amount, or may independently be different sizes. The angle between the shelf or shelves of the base and the side walls of the elevation is not particularly limited, but may generally be about 90°. The threaded rod may extend from the base or the threaded rod may extend from the elevation.

In embodiments where the threaded rod extends from the elevation of the head, the threaded rod may extend from approximately the centre of the elevation, or be offset in one or more directions. The general profile of the elevation when viewed down the axis of the threaded rod may be larger than the circumference of the threaded rod. The base may include two shelves extending from opposing sides of the elevation, such that the general profile of the head is substantially oblong in shape when viewed down the axis of the threaded rod. The general shape of the profile of the elevation when viewed down the axis of the threaded rod is not particularly limited; for example, it may be substantially square, circular, elliptical, rectangular etc., or irregular.

In embodiments where the threaded rod extends from the base of the head, the threaded rod may extend from approximately the centre of the base, or be offset in one or more directions. The elevation may extend from the base in substantially the same direction as the threaded rod. The elevation may also extend from the base at a position proximal or distal to the threaded rod. The elevation may substantially, but not completely, encircle the threaded rod, or it may extend from alongside only a portion of the threaded rod, whether proximal or distal thereto.

The general shape of the profile of the elevation is not particularly limited; for example, it may be substantially square, horse-shoe, rectangular or irregular. A second or more elevation may also be included, which may be as substantially described in the foregoing. When two or more elevations are included, preferably each extends from the base in generally the same direction from positions proximal to, and at opposite sides of, the threaded rod.

The fixing head may be a head including a base and an elevation as hereinbefore described, and include one or more protrusions for biting into a component. The location of the one or more protrusions for biting into a component is not particularly limited. For example, the one or more protrusions may adjoin the base and the elevation, more specifically independently adjoin a shelf of the base and side wall of the elevation. Alternatively, one or more protrusions may protrude from the base alone, and in substantially the same direction as the elevation(s). In a preferred embodiment, there may be any one of one to four or more protrusions, spaced evenly or irregularly around the base of the fixing head, including adjoining the base and the elevation(s).

In one particularly preferred embodiment, the head is not a fixing head. Even more preferably, the head is a hex head, and together the head and the threaded rod form a bolt.

In another particularly preferred embodiment, the head is a fixing head including a base and an elevation and together the head and the threaded rod form a bolt. Preferably the threaded rod extends approximately centrally from the elevation, and the general profile of the elevation when viewed down the axis of the threaded rod is larger than the circumference of the threaded rod. The base preferably includes two shelves extending about opposing sides of the elevation, such that the general profile of the head is substantially oblong in shape when viewed down the axis of the threaded bore. The general profile of the elevation when viewed down the axis of the threaded bore is preferably substantially square or elliptical in shape. The one or more protrusions for biting into a component preferably includes two protrusions, each adjoining a shelf and side wall on opposing sides of the threaded rod.

The retaining element may generally be any element which may be positioned on the threaded rod between the head and a fastener or between two fasteners. The retaining element may be biased by the biasing element towards the head or a nut of the fixing device. The retaining element may include for example, a washer, spacer, plate, or any other suitable element. In preferred embodiments, the retaining element may in general be the same as a nut, including a fixing nut, as hereinbefore described, except that the bore for receiving the threaded rod may be unthreaded, such that the retaining element may be slidably movable along the threaded rod. All other features, permutations and embodiments described above in respect of the nut are applicable to the retaining element.

In a particularly preferred embodiment, the unthreaded bore of the retaining element is formed approximately centrally through both the base and the elevation. The base preferably includes one shelf which extends substantially all around the elevation. The general shape of the profile of the elevation when viewed down the axis of the unthreaded bore is preferably substantially square. The one or more protrusions for biting into a component preferably includes two protrusions, each adjoining a shelf and side wall on opposing sides of the unthreaded bore. The one or more protrusions for biting into a component more preferably includes four protrusions, one each adjoining a side wall of the square profile elevation of the retaining element and a shelf of the base.

The fixing device may optionally include a second retaining element. Preferably, the second retaining element is also positioned on the threaded rod, and alongside the first retaining element, i.e. between the head and a fastener or between two fasteners. That is, as used herein, the term "between" does not preclude any one or more other or additional elements also being situated between the defined integers. Most suitably, the second retaining element is substantially identical to the first, including a base, elevation and protrusions for biting into a component, and is positioned so that its protrusions protrude in a direction towards those of the first retaining element.

The biasing element may be any element which may suitably bias the retaining element towards the head or a fastener. In a preferred embodiment, the biasing element is a spring. This may include, for example, a helical spring, tension spring, torsion spring, etc. Preferably, the biasing element abuts the retaining element and the head or a fastener. In preferred embodiments, the spring is a helical compression spring, and the biasing element biases the retaining element towards the head or fastener with which it is not in abutment. Preferably, the inside diameter of the helical compression spring is large enough so that the spring may receive the threaded rod there through. To this end, preferably the retaining element includes a recess for receiving the biasing element. The recess may be formed in the base of the retaining element. Preferably, the recess is formed coaxially with the unthreaded bore such that it forms a flange about the periphery of the unthreaded bore. The biasing element may suitably abut this flange.

Thus, there are a number of combinations of the nut, head, retaining element and biasing element which are particularly preferred. Exemplary preferred embodiments are summarised as follows:

The threaded rod includes a head which is not a fixing head (e.g. a hex head), the biasing element abuts the head and the retaining element, and the biasing element biases the retaining element towards a fixing nut;

The threaded rod includes a fixing head, the biasing element abuts a nut which is not a fixing nut (e.g. a hex nut), and the retaining element, and the biasing element biases the retaining element towards the fixing head;

The threaded rod includes a head which is not a fixing head (e.g. a hex head), the biasing element abuts the head and the retaining element, and the biasing element biases the retaining element towards a nut which is not a fixing nut (e.g. a hex nut).

In any of the above permutations, the head which is not a fixing head may be replaced with a nut which is not a fixing nut. Further, a second retaining element may be included alongside the first retaining element, particularly in embodiments where the head is not a fixing head and the nut is not a fixing nut.

As previously described, the retaining element, fixing nut and fixing head may include one or more protrusions for biting into a component. Suitably, the protrusions include an edge or point, and may be, for example, thorn, tooth or knife-shaped.

The threaded rod may be threaded along substantially all of its length, or a portion of its length. In preferred embodiments, the threaded rod is threaded along substantially all of its length.

The fixing device may be manufactured from any suitable materials. In embodiments including a protrusion(s) for biting into a component, the protrusion(s) may suitably be made of a material which is harder than the material of the components to be connected. Generally the fixing device or part thereof may be manufactured from steel, preferably hardened steel, and particularly preferably 10.9 hardened steel.

The fixing device may be manufactured to any size fit for purpose. The size may be based on a standard size of, for example, the threaded rod. Standard sizes include but are not limited to M1, M2, M3, etc., to M140 or M160, and any size there between. In preferred embodiments the fixing device is made to a standard size from M4 to M22, i.e. M4, M5, M6, M7, M8, M10, M12, M14, M16, M18, M20 and M22. Most preferably, the fixing device is made to an M10 or M12 standard size.

In another aspect, the present invention provides a fixing device for connecting components, said fixing device including:
  a threaded rod having a head,
  one or more fasteners,
  a retaining element, and
  a biasing element:
wherein the retaining element is positioned on the threaded rod between the head and a fastener, and wherein the biasing element biases the retaining element towards the head or a fastener.

In a preferred embodiment of this aspect, the threaded rod, head, fastener(s), retaining element and biasing element may independently be as hereinbefore generally described. The fixing device may be manufactured from any suitable materials, and be manufactured to any size fit for purpose, also as hereinbefore generally described.

In a preferred embodiment, the head is not a fixing head (e.g. a hex head), the biasing element abuts the head and the retaining element, and the biasing element biases the retaining element towards a fixing nut.

In another preferred embodiment, the head is a fixing head, the biasing element abuts a nut which is not a fixing nut (e.g. a hex nut), and the retaining element, and the biasing element biases the retaining element towards the fixing head.

In another aspect, the present invention provides a fixing device for connecting components, said fixing device including:
  a threaded rod,
  at least two fasteners,
  a retaining element, and
  a biasing element:
wherein the retaining element is positioned on the threaded rod between the two fasteners, and wherein the biasing element biases the retaining element towards a fastener.

In preferred embodiments of this aspect, the threaded rod, fasteners, retaining element and biasing element may independently be as hereinbefore generally described. The fixing device may be manufactured from any suitable materials, and be manufactured to any size fit for purpose, also as hereinbefore generally described.

In a preferred embodiment, the two fasteners are nuts, wherein one fastener is not a fixing nut (e.g. a hex nut), and one fastener is a fixing nut, and wherein the biasing element abuts the fastener which is not a fixing nut and the retaining element, and the biasing element biases the retaining element towards the fixing nut.

In another preferred embodiment, the two fasteners are nuts, wherein the two fastener are not fixing nuts (e.g. hex nuts), a second retaining element is included alongside a first retaining element, and wherein the biasing element abuts a fastener and the first retaining element, and the biasing element biases the retaining element towards the fastener with which it is not in abutment.

In another aspect, the present invention provides a fixing device for connecting components, including a threaded rod having a head, a fixing nut, and a retaining element.

In this aspect, the threaded rod, head, fixing nut and retaining element may independently be as hereinbefore generally described. The fixing device may be manufactured from any suitable materials, and be manufactured to any size fit for purpose, also as hereinbefore generally described.

The components for which the fixing devices of the present invention are suitable for connecting are not particularly limited. A useful application includes where a component is a sheet material. The sheet material may include, for example, a metal, plastic or rubber material. Most suitably, the material is a metal material, preferably steel. A particularly useful application is connecting components of steel structural support systems, including framing, racking, scaffolding, and piping systems and the like, which may be used to support, for example, pipe work, fans, coolers, electrical trays, shelving, mezzanine flooring and the like. The preferred components for steel structural support systems include square profile components such as those available from Flexistrut Australia under the tradename Supa50™ Supa80™ and Supa100™ and various other components including adapters, bases, beams, ends, joints, brackets, joiners, connectors, shoes, braces and the like.

In preferred embodiments, the components include an opening for receiving the threaded rod. The opening may be, for example, a hole or a slot and the like. The slot may be an open or an enclosed slot. In preferred embodiments, the width or diameter of the opening is such that the elevation, which may be present in one or more of a nut, retaining element and head of the fixing device, fits therein. The number of components to be connected is not particularly limited. In preferred embodiments the number of components to be connected is two. The opening in each component to be connected may independently be the same or different. For example, one component may include a round hole while another component may include a slot. Alternatively, all components may include a slot.

In another aspect, the present invention provides a method for connecting components using the fixing device of the present invention as hereinbefore described, said method including the step of arranging the components between the retaining element and either of the head or a nut, or between two retaining elements, such that the biasing element causes the retaining element and the head or nut, or the two retaining elements, to abut the components.

The arranging of the components between the retaining element and either of the head or a nut may be performed by assembling the fixing device about the components. This may be done, for example, by positioning the retaining element on the threaded rod having a head or nut, with a biasing element, passing the threaded rod through the opening in the components, optionally creating tension in the biasing element, and threading a nut on to the threaded rod, with or without positioning a second retaining element on the threaded rod. The same may also be performed by passing the threaded rod with either a head or nut, and optionally with a retaining element positioned on the threaded rod, through the opening in the components, positioning a retaining element on the threaded rod, with a biasing element, optionally creating tension in the biasing element, and threading a nut onto the threaded rod.

In a particularly preferred embodiment, the arranging of the components between the retaining element and either of the head or a nut may be performed with the fixing device already assembled. For example, in the case of an open slot, the fixing device may be slid onto the components through the opening in the slot, optionally by creating tension in the biasing element by forcing the retaining element against the direction of bias, sliding the threaded rod into the slot, and releasing the tension in the biasing element to cause the head or nut and retaining element to abut the components. In the case of a closed slot, the head or nut of a fixing device which is substantially oblong in shape as described above, may be passed lengthways through the slot, optionally by creating tension in the biasing element by forcing the retaining element against the direction of bias, then turning the oblong head or nut crosswise to the slot, and releasing the tension in the biasing element to cause the head or nut and retaining element to abut the components.

Suitably, tension is retained in the biasing element of the arranged fixing device sufficient to cause the retaining element and the head or nut, or the two retaining elements, to abut the components with sufficient force to hold the weight of the fixing device. In embodiments where protrusions may not be included, the fixing device is arranged such that an elevation of the retaining element and/or either of the head or nut fits within an opening of the component(s), such that the shelf or shelves of the head, nut and/or retaining element abut the components. A torsional force may then be applied to either a nut or head without rotation of the other, or without rotation of the retaining element. In embodiments including protrusions, the tension in the retaining element may be sufficient to cause the protrusions to abut the component(s) with sufficient force so that a torsional force may then be applied to either a nut or head without rotation of the other, or without rotation of the retaining element.

A particular advantage of the present invention thus arises from the biasing element, as it may allow for the fixing device to remain in place without assistance, and may prevent slippage while torqueing the fixing device. A torsional force may thus be applied to either the head or a nut, using for example a tool such as a spanner, socket wrench or ratchet gun, without the need for a second tool, or hand, to hold the fixing device, or other elements thereof, in place. This may simplify the process of connecting components and reduce the risk of injury. It may also reduce the time taken to connect components, which is significant, particularly as several hundred or thousands of the fixing devices may usually be used for a given application, i.e. connecting components for structural support systems, including warehouse racking, framing, scaffolding and piping systems.

Accordingly, in another aspect, the present invention provides the use of a biasing element for biasing a retaining element towards a head or a nut of a fixing device for connecting components, said fixing device including a threaded rod optionally having a head, one or more nuts, and a retaining element positioned on the threaded rod between the head and a nut or between two nuts.

The method for connecting components using the fixing device of the present invention as hereinbefore described may thus include the additional step of applying a torsional force to a head or nut. The torsional force may then cause the threaded rod to thread through a nut, causing the retaining element and the head or a nut between which the components are arranged, to pull closer together while tightening the abutment of the components and increasing the tension in the biasing element. In preferred embodiments, the retaining element includes a recess into which the biasing element folds as the torsional force is applied. Suitably, sufficient torsional force is applied to cause the retaining element to fold substantially completely. Alternatively, or together, sufficient torsional force is applied to cause the retaining element to fold substantially all the way into the recess so that the head or nut abuts the retaining element. The fixing device may then be threaded tight by continued torsional which may then cause the protrusions to bite into the components.

According to this method, it may be particularly advantageous to use a preferred retaining element which includes four protrusions for biting into a component, one each adjoining the shelf of a base and sidewall of a square profile elevation. For example, where the opening in the component is a hole, continued torsional force may cause all four of the protrusions to bite into the components. Alternatively, where the opening is a slot and the fixing device is arranged at the end of the slot, continued torsional force may cause three of the protrusions to bite into the components. Furthermore, as compared to a retaining element having two or only one protrusion, and where the opening in the components is a slot, in the step of arranging the components between the retaining element and either of the head or a nut, or between two retaining elements, the retaining element may usually be arranged so that at least two of the protrusions abut the components without any need to manually rotate the retaining element so as to cause the protrusions to abut the components.

In particularly preferred embodiments, the fixing device includes a head which is not a fixing head (e.g. a hex head), and a fixing nut, and the torsional force is applied to the head. A particular advantage is thus arising from the fixing nut, as it permits the use of a threaded rod having a head which is not a fixing head (e.g. a hex head) and accordingly a bolt, which may be a standard size bolt. In many applications, the fixing device may be used in structural support systems with an exposed surface, e.g. racking, scaffolding, piping systems, walls, etc. The fixing device may thus be used to connect components as described above, where the exposed profile of the fixing device includes the head which is not a fixing head. This excludes any threaded rod from being present in the exposed profile of the fixing device, providing a neater finish and less exposure for catching or snagging.

Accordingly, in another aspect, the present invention provides a fixing nut for use with a fixing device of the present invention as hereinbefore described.

In another aspect, the present invention provides a kit of parts for a fixing device for connecting components, including a fixing nut and a retaining element. Preferably, the kit also independently includes a biasing element and a threaded rod having a head. More preferably, the kit also includes instructions to use the kit in a method according to the present invention, as hereinbefore described.

The present invention will now be more fully described with reference to the accompanying Examples. It should be understood, however, that the description following is illustrative only and should not be taken in any way as a restriction on the generality of the invention described above.

BRIEF DESCRIPTION OF THE FIGURES

FIG. 1A is an isometric projection, FIG. 1B is a side view, FIG. 1C is an end-view, FIG. 1D is a top view and FIG. 1E is a bottom view.

FIG. 2A is an isometric projection, FIG. 2B is a side view, FIG. 2C is an end-view, FIG. 2D is a top view and FIG. 2E is a bottom view.

FIG. 4A is a top plan view, FIG. 4B is a side cross-sectional view of section B-B of FIG. 4A, and FIG. 4C is a side cross-sectional view of section D-D of FIG. 4A.

FIG. 5A is a top plan view, FIG. 5B is a side cross-sectional view of section BA-BA of FIG. 5A, and FIG. 5C is a side cross-sectional view of section BB-BB of FIG. 5A.

FIG. 6A is an isometric projection, FIG. 6B is a side plan view and FIG. 6C is a cross-sectional view of section B-B of FIG. 6B.

FIG. 8A is a top plan view, FIG. 8B is a side cross-sectional view of section M-M of FIG. 8A, and FIG. 8C is a side cross-sectional view of section N-N of FIG. 8A.

FIG. 9A is a top plan view, FIG. 8B is a side cross-sectional view of section O-O of FIG. 9A, and FIG. 9C is a side cross-sectional view of section P-P of FIG. 9A.

FIG. 11A is a top plan view, FIG. 11B is a side cross-sectional view of section X-X of FIG. 11A, and FIG. 11C is a side cross-sectional view of section Y-Y of FIG. 11A.

FIG. 12A is a top plan view, FIG. 12B is a side cross-sectional view of section AD-AD of FIG. 12A, and FIG. 12C is a side cross-sectional view of section AE-AE of FIG. 12A.

FIG. 13A is an isometric projection, FIG. 13B is a side plan view and FIG. 13C is a cross-sectional view of section B-B of FIG. 13B.

FIG. 15A is a top plan view, FIG. 15B is a side cross-sectional view of section AO-AO of FIG. 15A, and FIG. 15C is a side cross-sectional view of section AN-AN of FIG. 15A.

FIG. 16A is a top plan view, FIG. 16B is a side cross-sectional view of section AY-AY of FIG. 16A, and FIG. 16C is a side cross-sectional view of section AZ-AZ of FIG. 16A.

DETAILED DESCRIPTION OF THE EMBODIMENTS

Figure 1:
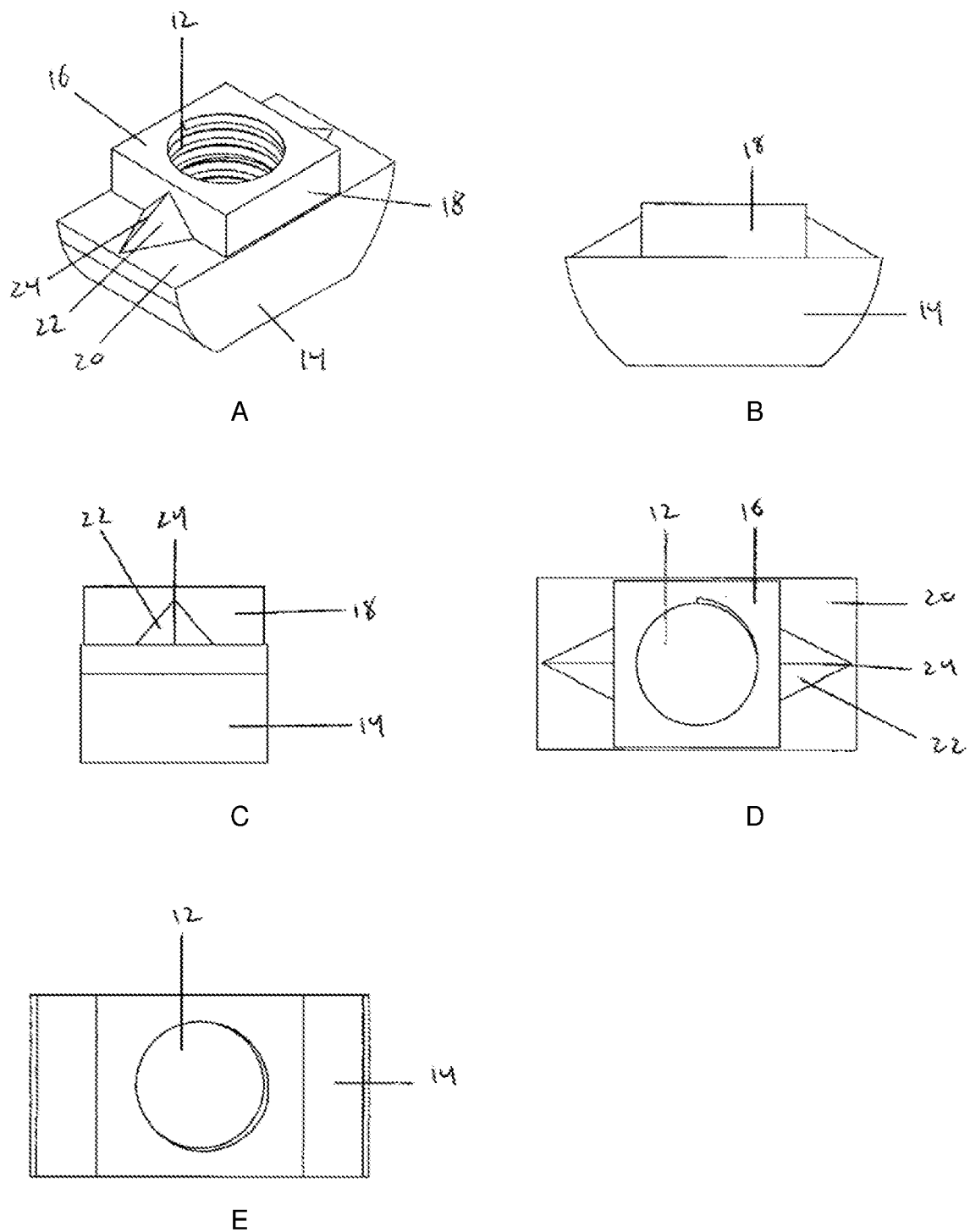
FIGS. 1A-E depict a fixing nut for use in a fixing device of the present invention.
Figure 2:
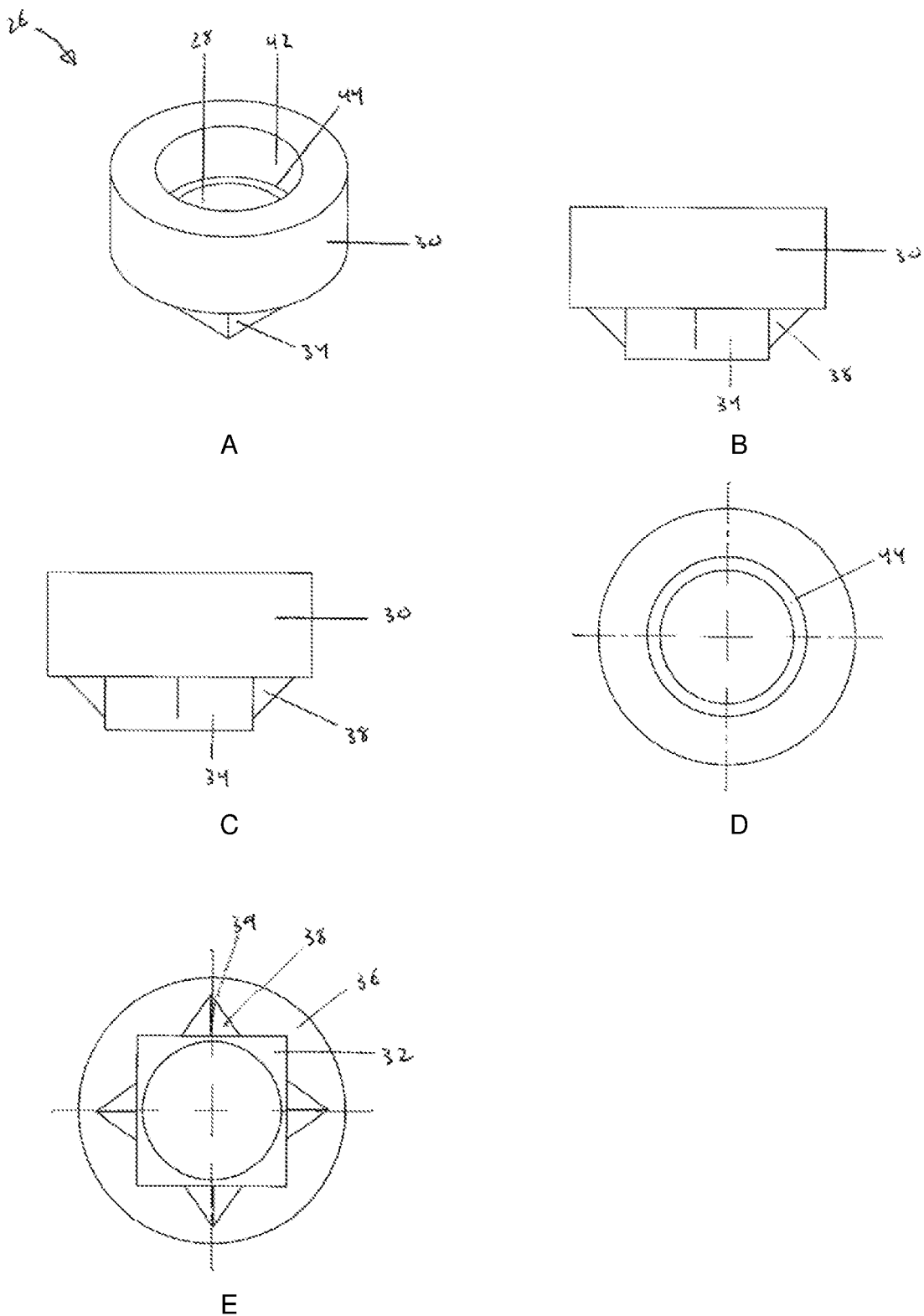
FIGS. 2A-E depict a retaining element for use in a fixing device of the present invention.

A fastener 10 for use in a fixing device of the present invention is shown in FIGS. 1A-E. The fastener is a fixing nut which has a threaded bore 12 for threadably receiving a threaded rod (threaded rod not shown), a base 14 and an elevation 16. The elevation extends from the base by sidewalls 18. The general profile of the elevation when viewed down the axis of the threaded bore is square, and smaller than that of the base, such that the base includes two shelves 20 extending about opposing sides of the elevation. The threaded bore is formed centrally through both the base and the elevation, such that the shelves independently extend by about the same amount. The fixing nut is thus generally oblong in shape when viewed down the axis of the threaded bore. The angle between the shelves of the base and the sidewalls of the elevation is about 90°. The fixing nut also includes two protrusions 22 for biting into a component (component not shown). The protrusions are generally tooth shaped including an edge 24, and each protrusion adjoins a shelf of the base and side wall of the elevation.

A retaining element 26 for use in a fixing device of the present invention is shown in FIGS. 2A-E. The retaining element has an unthreaded bore 28 for positioning the retaining element on a threaded rod (threaded rod not shown). It also has a base 30 and an elevation 32. The elevation extends from the base by sidewalls 34. The general profile of the elevation when viewed down the axis of the unthreaded bore is square, and smaller than that of the base, such that the base includes a shelf 36 which extends substantially all around the elevation. The unthreaded bore is formed centrally through both the base and the elevation such that the shelf extends approximately uniformly all around the elevation. The general profile of the base is not particularly limited, but is shown to be circular in this example when viewed down the axis of the unthreaded bore. The angle between the shelf of the base and the sidewalls of the elevation is about 90°. The retaining element also includes four protrusions 38 for biting into a component (component not shown). The protrusions are generally tooth shaped including an edge 39. Each of the protrusions adjoins a side wall of the elevation and the shelf of the base. The base of the retaining element also includes a recess 42 for receiving a biasing element (biasing element not shown). The recess is formed in the base coaxially with the unthreaded bore such that it forms a flange 44 about the periphery of the unthreaded bore. The biasing element may suitably abut this flange.

Figure 3:
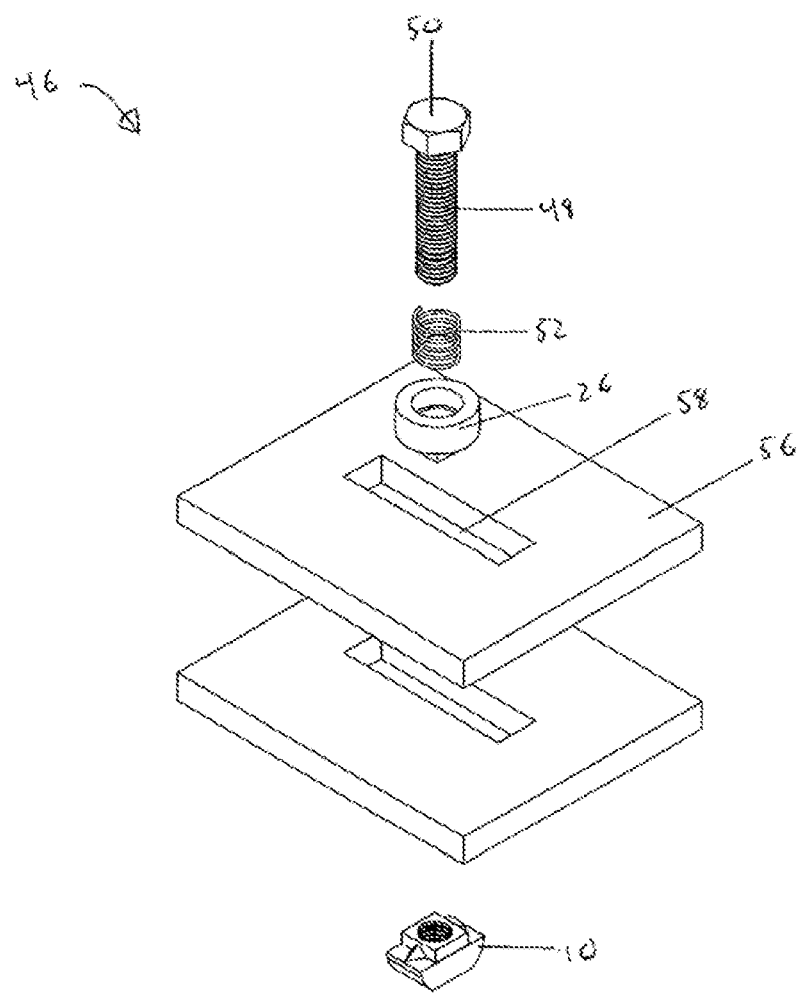
FIG. 3 is an isometric projection of an exploded view of a fixing device of the present invention with components.

FIG. 3 depicts an exploded view of a fixing device 46 of the present invention. The fixing device includes a threaded rod 48 with a head 50, a biasing element which is a helical compression spring 52, a retaining element 26 and a fastener which is a fixing nut 10. The head is a hex head, which together with the threaded rod forms a bolt. The inside diameter of the helical compression spring is large enough to receive the threaded rod there through. The retaining element is the same as the retaining element depicted in FIGS. 2A-E and described above. Two components 56 to be connected are also shown between the retaining element and the fixing nut. The components have openings by way of slots 58. The fixing nut is the same as the fixing nut depicted in FIGS. 1A-E and described above. The nut is depicted in an orientation which is crosswise to the slots in the components, but it can generally be seen that the dimensions of the fixing nut are such that it fits lengthways through the slots.

Figure 4:
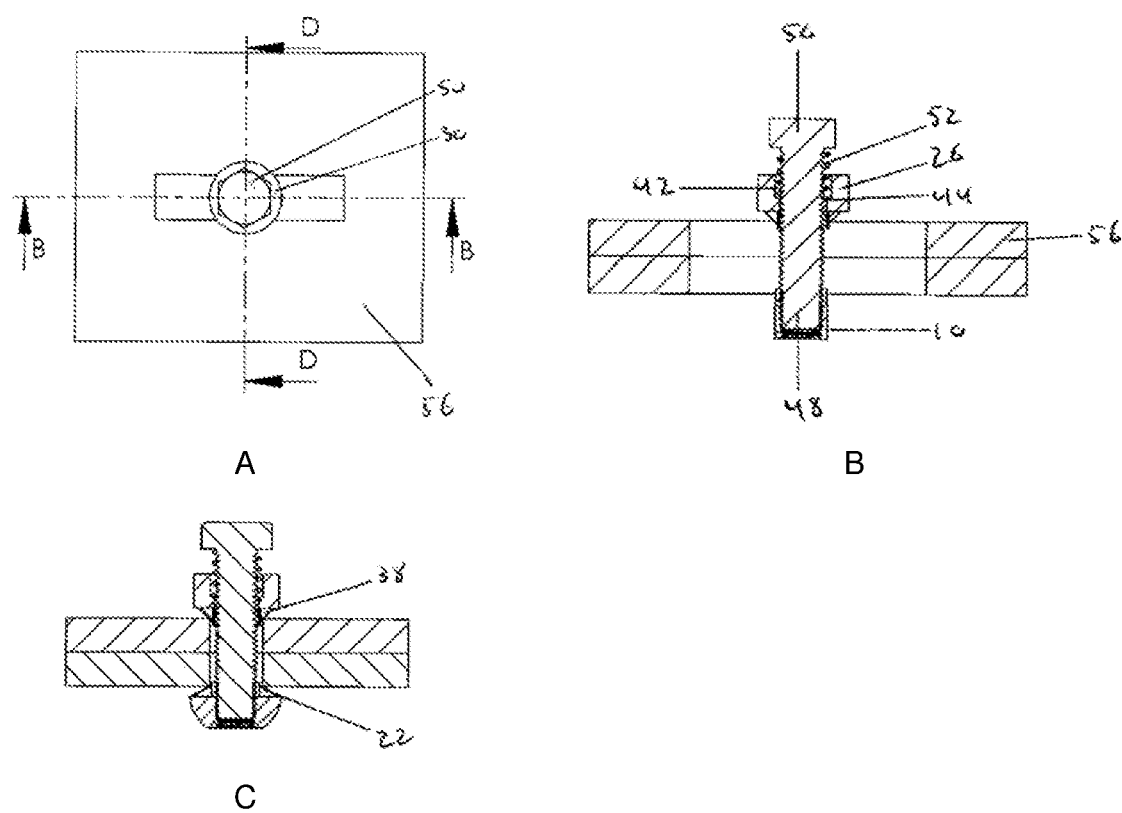
FIGS. 4A-C depict the fixing device of FIG. 3 of the present invention arranged with components.

FIGS. 4A-C show the fixing device of FIG. 3 of the present invention when assembled and arranged with components 56 to be connected. The hex head 50 and base 30 of the retaining element are indicated in FIG. 4A. FIG. 4B is a cross-sectional view taken about the section B-B of FIG. 4A. It can be seen that the retaining element 26 and spring 52 are positioned on the threaded rod 48. The fixing nut 10 is also threaded to the threaded rod such that the components are arranged between the fixing nut and retaining element. The spring abuts the hex head and is received in a recess 42 of, and abuts a flange 44 formed in, the base of the retaining element. There is tension in the spring such that it biases the retaining element towards the fixing nut. The bolt has not been threaded tight through the fixing nut in this depiction; it can be seen that the threaded rod proceeds only partway through the threaded bore of the fixing nut, and the spring has not been folded completely, or has not been folded all the way in to the recess of the retaining element. The tension in the spring between the hex head and the retaining element causes the protrusions of the retaining element and the fixing nut to abut the components about the periphery of the slots. This is better represented in FIG. 4C, which is a cross-sectional view taken about the section D-D of FIG. 4A. It can clearly be seen that the protrusions 22 and 38 of both the retaining element and the fixing nut abut the components about the periphery of the slots. Also represented is a general dimension of the elevations of both the retaining element and the fixing nut, which fit within the width of the slots of the components.

FIGS. 4A-C together also show the ease with which the assembled fixing device may be arranged with the components to be connected. For example, referring to FIGS. 4B-C, disarrangement may be achieved by pressing on the hex head 50 of the fixing device sufficient to force the hex head and retaining element 26 together to create tension in the spring 52 against the direction of bias which may free the fixing nut 10 from abutment with the components. The hex head may then be turned which will cause the fixing nut to turn, to orient the fixing nut lengthwise with the slots. The tension in the spring may then be released and the fixing nut passed lengthways through the slots. The assembled fixing device can be arranged with components to be connected be reversing these steps.

Figure 5:
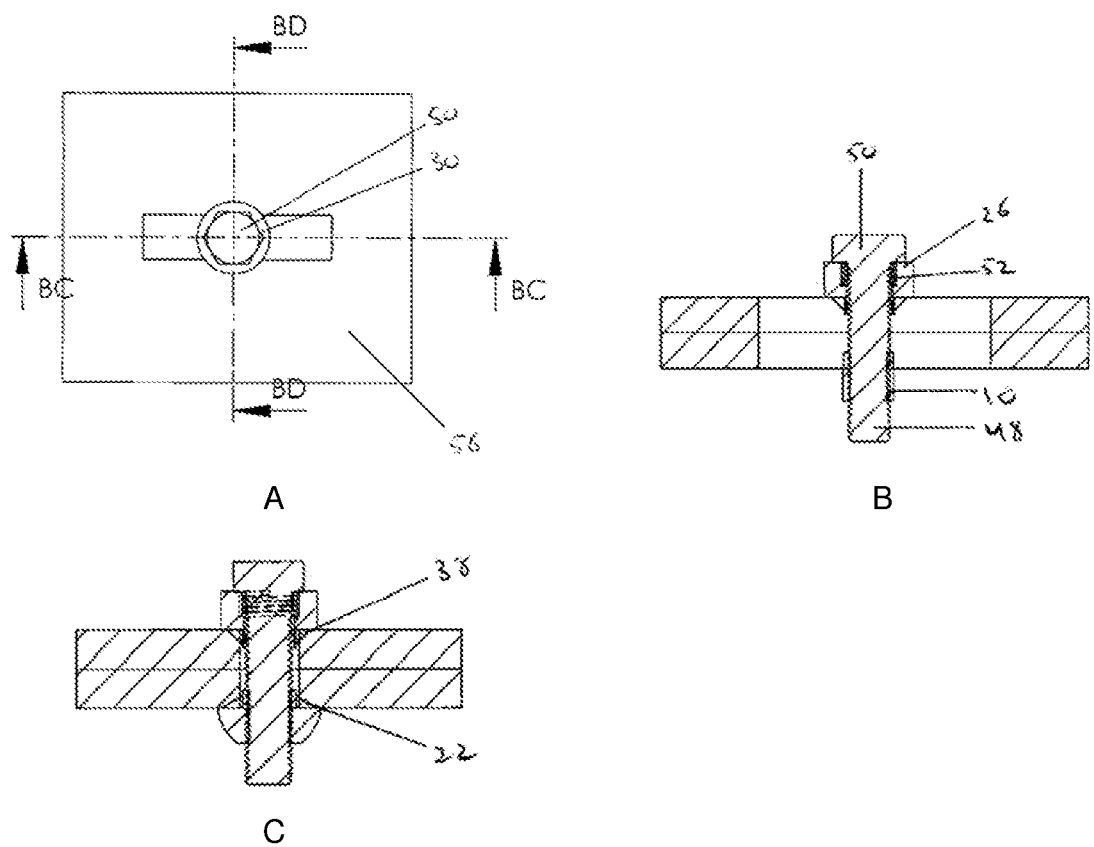
FIGS. 5A-C depict the fixing device of FIG. 3 of the present invention arranged and threaded tight with components.

FIGS. 5A-C show the fixing device of FIG. 3 of the present invention when arranged and threaded tight with components 56 to be connected. The hex head 50 and base 30 of the retaining element are indicated in FIG. 5A. FIG. 5B is a cross-sectional view taken about the section BC-BC of FIG. 5A. The bolt is now threaded tight through the fixing nut 10 such that the threaded rod 48 proceeds completely through the threaded bore of the fixing nut, and the spring 52 has been folded completely, or folded all the way in to the recess 42 of the retaining element, such that the hex head now abuts the base of the retaining element 26. The bolt is threaded tight also so as to cause the protrusions of the retaining element and the fixing nut to bite into the components. This is better represented in FIG. 5C, which is a cross-sectional view taken about the section BD-BD of FIG. 5A. It can be seen that the protrusions 38 and 22 of both the retaining element and the fixing nut bite into the components and the shelves of the retaining element and the fixing nut also now abut the components. It can also be seen that the elevations of both the retaining element and the fixing nut fit within the width of the slots of the components and the elevations extend from the base of the fixing nut and retaining element by an amount which is less than the thickness of the components to be connected.

Figure 6:
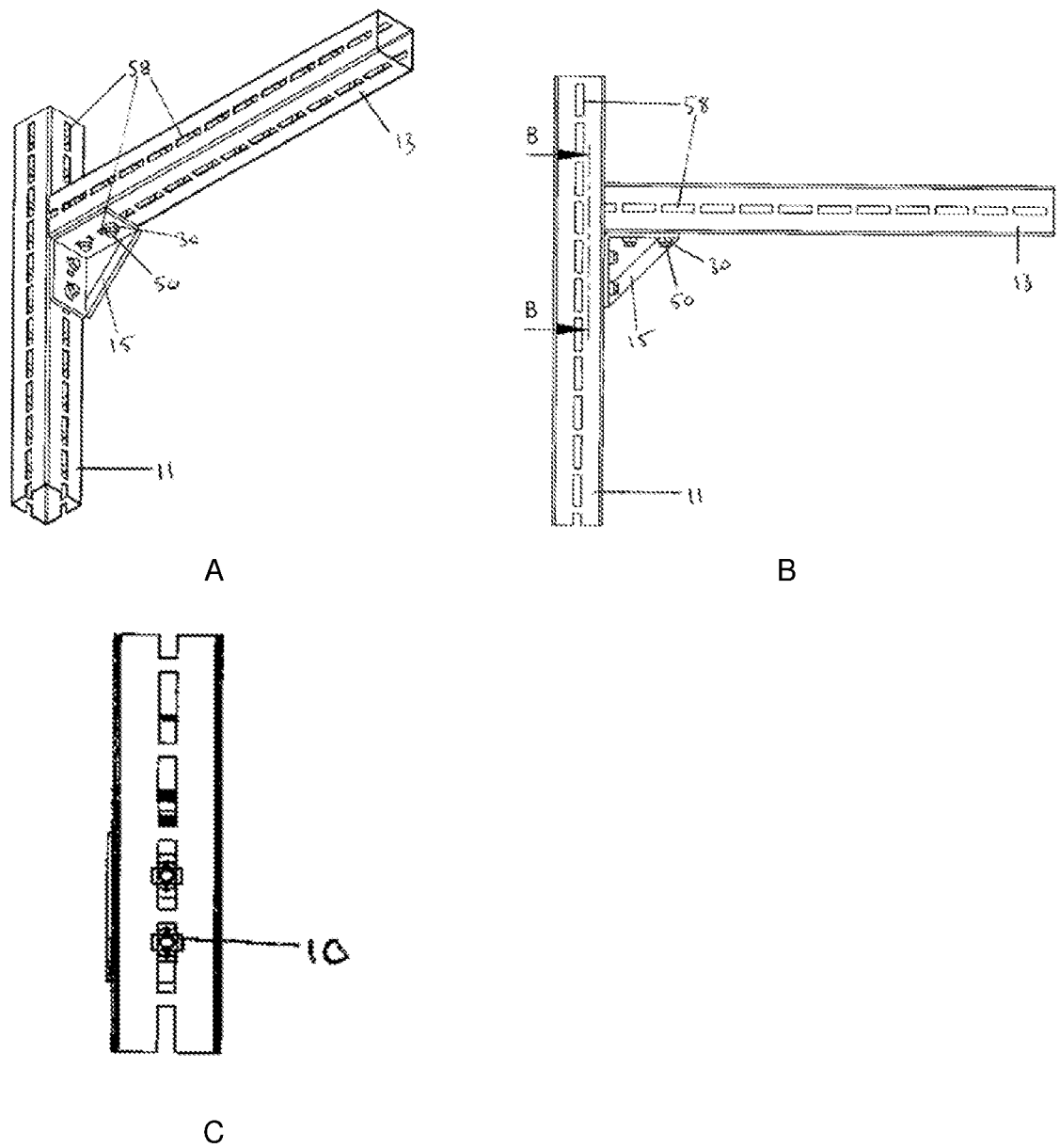
FIGS. 6A-C depict the fixing device of FIG. 3 of the present invention arranged and threaded tight with components including square profile components.

FIGS. 6A-C show the fixing device of FIG. 3 of the present invention when arranged and threaded tight with components to be connected, including square profile components 11 and 13 and an angle bracket with gusset component 15 for a steel structural support system. While an angle bracket with gusset is shown, various other components are equally applicable, including adapters, bases, ends, joints, brackets, joiners, connectors, shoes, braces and the like. The components have openings by way of slots 58. In FIGS. 6A and 6B, the hex head 50 and base 30 of each fixing device are shown. The components are arranged between the retaining element and the fixing nut (fixing nut not shown) of the fixing device such that the threaded rod of each fixing device (threaded rod not shown) passes through a slot in the bracket component 15 and a slot in a square profile component 11 or 13. The bolt is threaded tight through the fixing nut such that the hex head abuts the base of the retaining element and the protrusions of the retaining element and the fixing nut (protrusions not shown) bite into the components. FIG. 6C is a cross-sectional view taken about section B-B of FIG. 6B, and shows the fixing nut 10 oriented crosswise to the slots in the components. It can generally be seen that the dimensions of the fixing nut are such that it fits lengthways through the slots. Thus, before the fixing device is threaded tight, the arranging of the components may be performed with the fixing device already assembled by passing the fixing head lengthways through the slot, then turning the fixing head crosswise to the slot.

Figure 7:
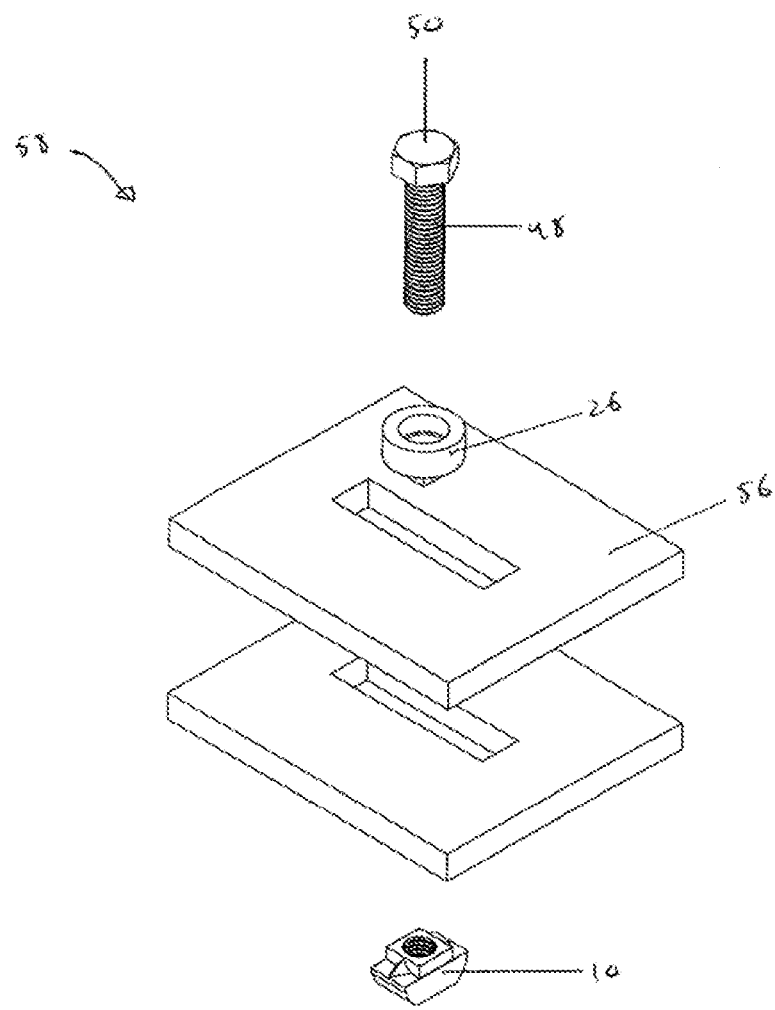
FIG. 7 is an isometric projection of an exploded view of an alternative fixing device of the present invention with components.
Figure 8:
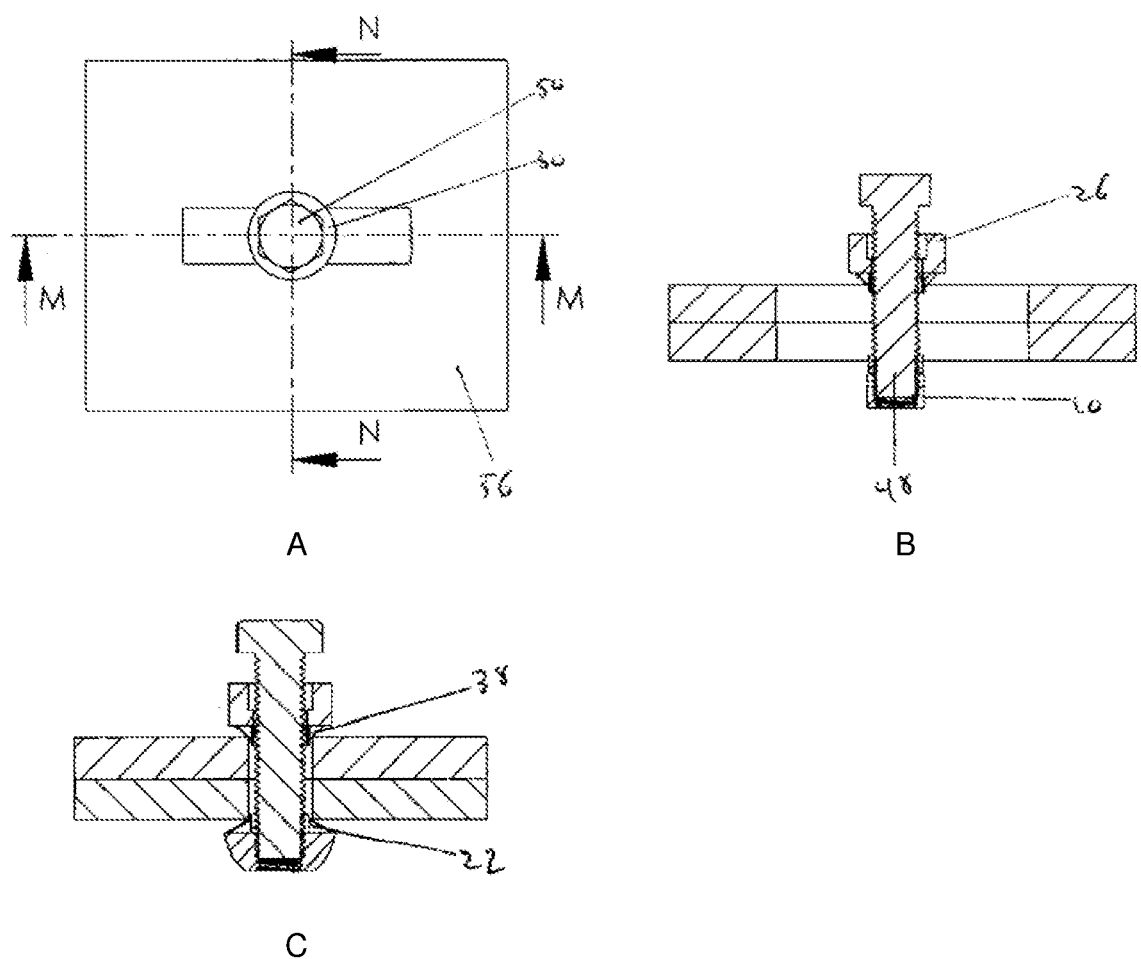
FIGS. 8A-C depict the fixing device of FIG. 7 of the present invention arranged with components.
Figure 9:
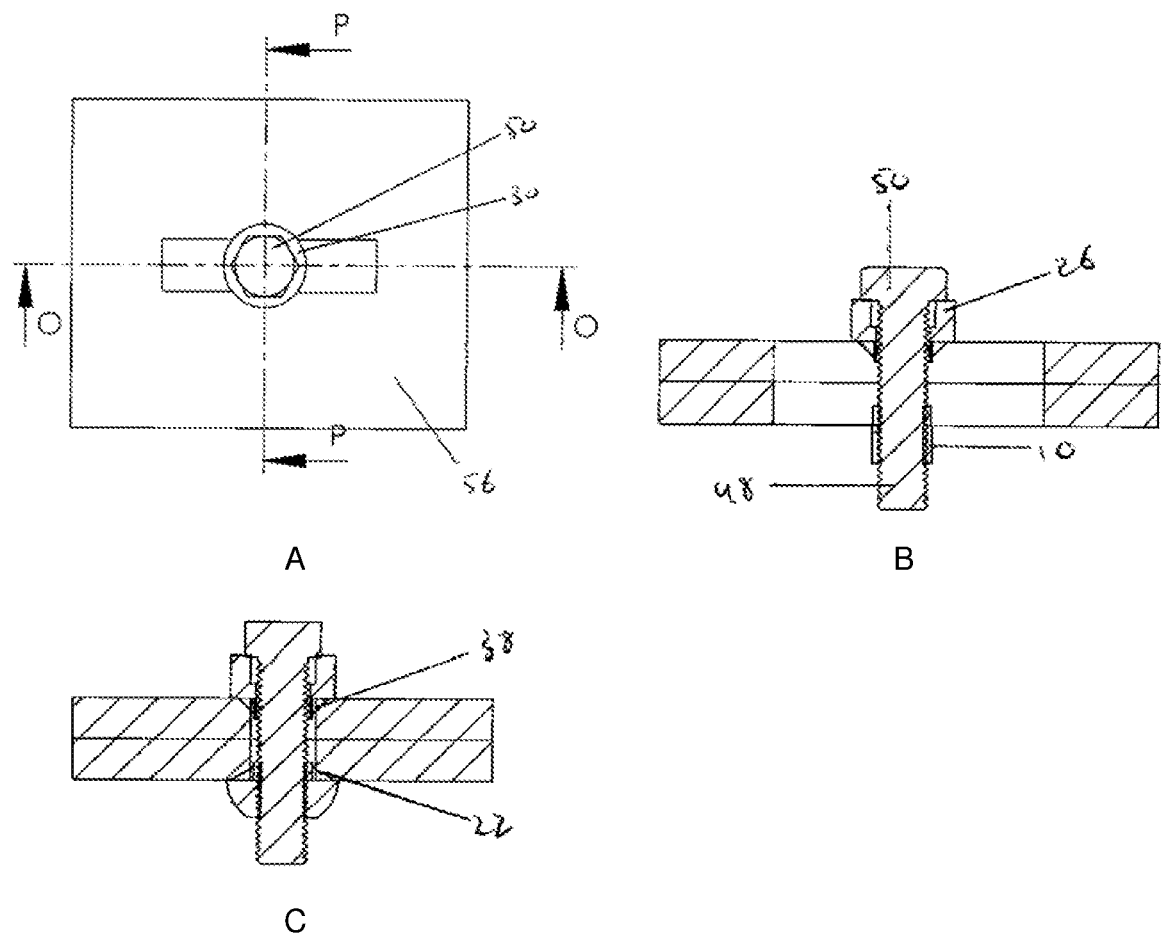
FIGS. 9A-C depict the fixing device of FIG. 7 of the present invention arranged and threaded tight with components.

FIGS. 7-9C show an alternative fixing device 58 of the present invention. In this embodiment, the fixing device is substantially the same as the fixing device 46 of FIGS. 3-5C, except that a biasing element, or spring, is not included. The fixing device 58 in FIG. 7 includes a bolt being a threaded rod 48 together with a hex head 50, a retaining element 26 and a fixing nut 10. The retaining element is the same as the retaining element depicted in FIGS. 2A-E and described above. This includes a recess in the body for receiving a biasing element; however this recess is not necessary in this embodiment. Two components to be connected 56 are also shown between the retaining element and the fixing nut. The fixing nut 10 shown is the same as the fixing nut depicted in FIGS. 1A-E and described above. In FIGS. 8A-C, the fixing device of FIG. 7 is shown when arranged with components to be connected. FIG. 8A is a view towards the hex head 50 and the base 30 of the retaining element can also be seen. FIGS. 8B and 8C are cross-sectional views taken about the sections M-M and N-N of FIG. 8A, respectively, showing the retaining element positioned on the threaded rod 48 and components 56 arranged between the retaining element 26 and the fixing nut 10 threaded onto the threaded rod. The bolt has not been threaded tight through the fixing nut in this depiction. FIGS. 9A-C present the same views as FIGS. 8A-C of the fixing device of FIG. 7, where now the fixing device has been threaded tight with components to be connected. The hex head 50 abuts the base of the retaining element, the protrusions 38 and 22 of both the retaining element 26 and the fixing nut 10 are biting into the components to be connected, and the shelves of the retaining element and the fixing nut also now abut the components. The fixing device of FIG. 7 when arranged and threaded tight with square profile components and an angle bracket with gusset component for a steel structural support system would appear substantially identical to FIG. 6A-C (i.e. excluding a spring biasing element).

FIGS. 10-12C show an alternative fixing device 60 of the present invention. In this embodiment, referring to FIG. 10, the fixing device includes a threaded rod 48 and a fixing head 62, which together form a bolt, a biasing element 52 which is a helical compression spring, a retaining element 26 and a fastener which is a hex nut 64. The fixing head is generally the same as the fixing nut described above, except that instead of a threaded bore the threaded rod extends therefrom. The inside diameter of the helical compression spring is large enough to receive the threaded rod there through. The retaining element is the same as the retaining element depicted in FIGS. 2A-E and described above. Two components 56 are also shown between the retaining element and the fixing head. The fixing head includes a base 66 and an elevation 68. The elevation extends from the base by sidewalls 70. The general profile of the elevation when viewed down the axis of the threaded rod is smaller than that of the base, but larger than the circumference of the threaded rod. The base includes two shelves 72 extending about opposing sides of the elevation. The threaded rod extends centrally from the elevation and the elevation is formed centrally from the base, such that the shelves independently extend by about the same amount. The fixing head is thus generally oblong in shape when viewed down the axis of the threaded rod. The angle between the shelves of the base and the sidewalls of the elevation is about 90°. The fixing head also includes two protrusions 74 for biting into a component. The protrusions are generally tooth shaped including an edge, and one each adjoins a shelf of the base and side wall of the elevation. The fixing head is depicted in an orientation which is crosswise to the slots in the components, but it can generally be seen that the dimensions of the fixing head are such that it fits lengthways through the slots.

Figure 10:
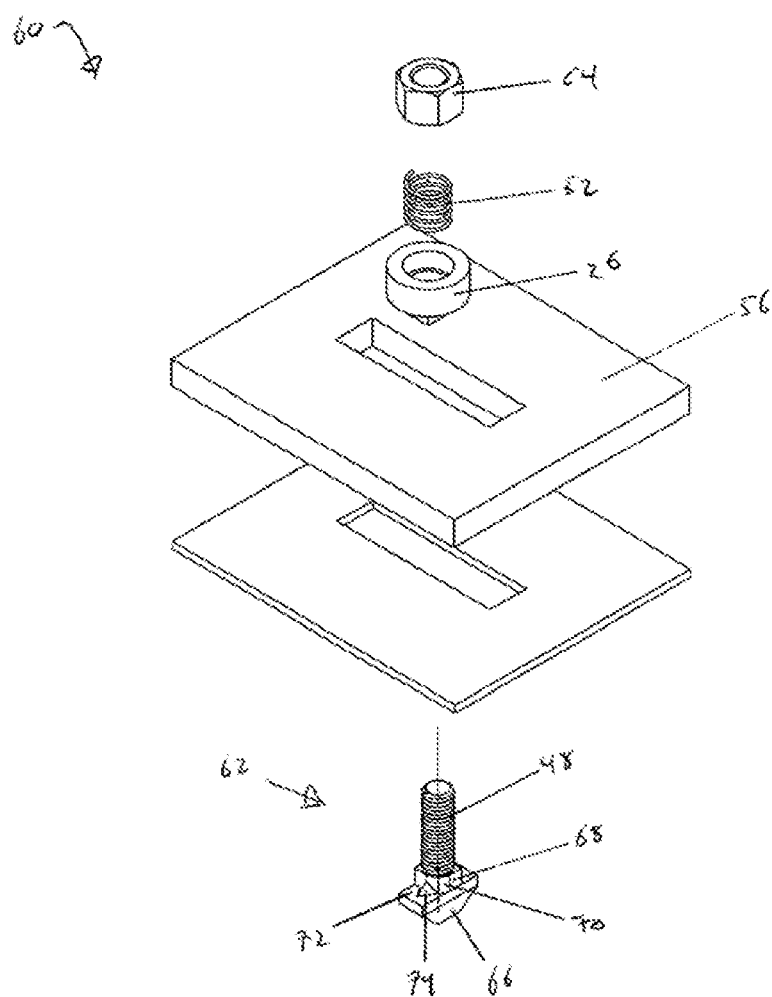
FIG. 10 is an isometric projection of an exploded view of an alternative fixing device of the present invention with components.
Figure 11:
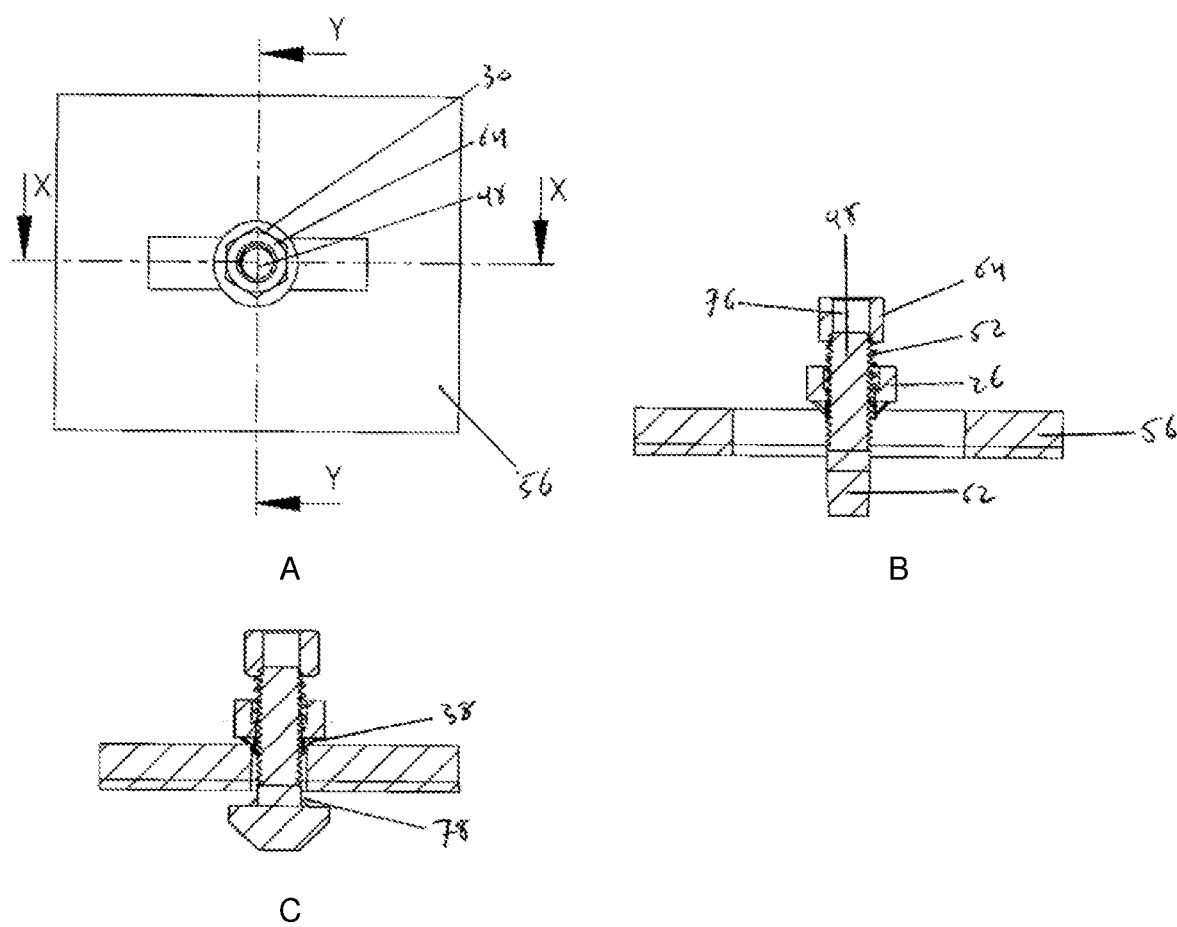
FIGS. 11A-C depict the fixing device of FIG. 10 of the present invention arranged with components.
Figure 12:
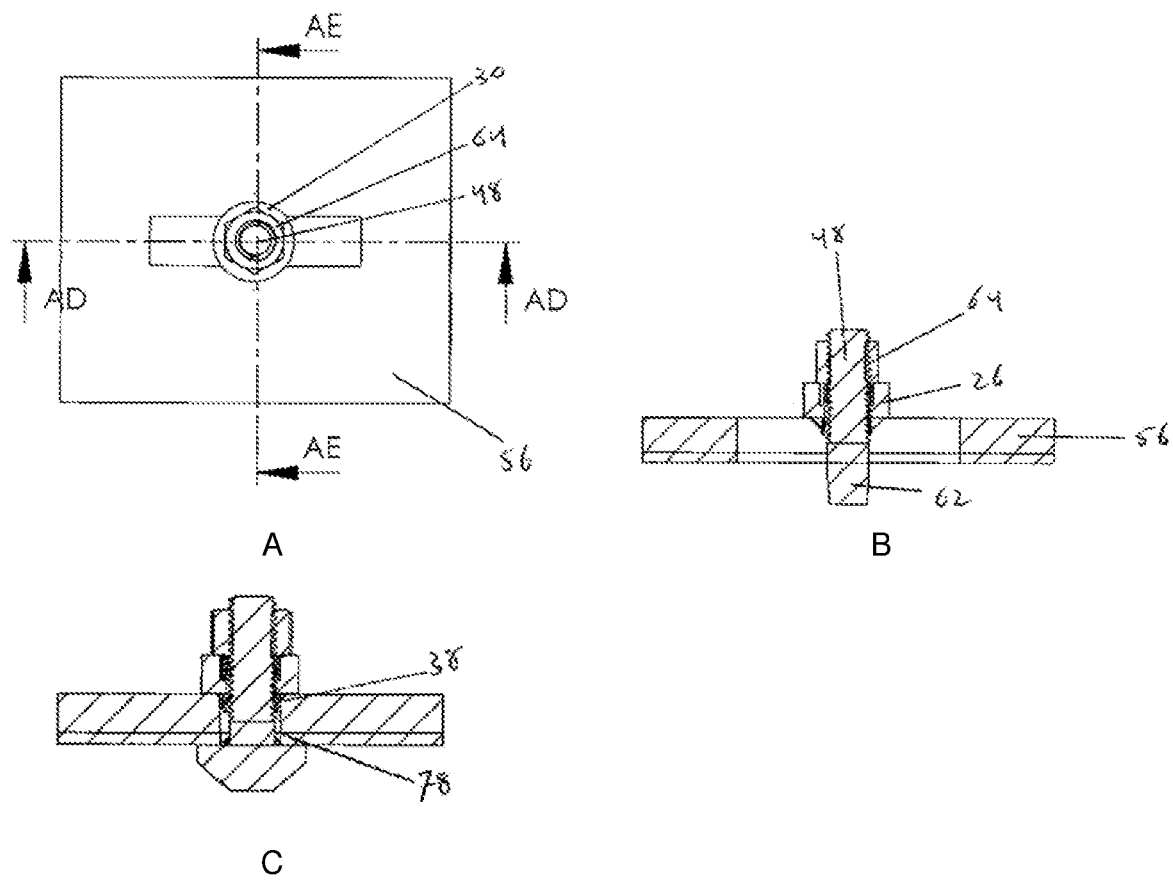
FIGS. 12A-C depict the fixing device of FIG. 10 of the present invention arranged and threaded tight with components.

FIGS. 11A-C show the fixing device 60 of FIG. 10 of the present invention when assembled and arranged with components to be connected. FIG. 11A is a view towards the hex nut 64. The end of the threaded rod 48 and base 30 of the retaining element are also indicated. FIGS. 11B and 11C are cross-sectional views taken about the sections X-X and Y-Y of FIG. 11A, respectively. In FIG. 11B, it can be seen that the retaining element 26 and spring 52 are positioned on the threaded rod 48 and the components 56 are arranged between the retaining element and the fixing head 62. The spring abuts the hex nut and is received in a recess of, and abuts a flange formed in, the base of the retaining element. There is tension in the spring such that it biases the retaining element towards the fixing head. The hex nut has not been threaded tight in this depiction; it can be seen that the threaded rod proceeds only partway through the threaded bore 76 of the hex nut, and the spring has not been folded completely, or has not been folded all the way in to the recess of the retaining element. The tension in the spring between the hex nut and the retaining element causes the protrusions 38 and 78 of the retaining element and the fixing head to abut the components about the periphery of the slots. This is better represented in FIG. 11C. It can clearly be seen that the protrusions 38 and 78 of both the retaining element and the fixing head abut the components about the periphery of the slots. Also represented is a general dimension of the elevations of both the retaining element and the fixing head, which fit within the width of the slots of the components.

FIGS. 11A-C together also show the ease with which the assembled fixing device may be arranged with the components to be connected. This is achieved in a similar way to the embodiment described above in FIGS. 4A-C. For example, disarrangement may be achieved by pressing on the hex nut of the fixing device sufficient to force the hex nut and retaining element together to create tension in the spring against the direction of bias. This may free the fixing head from abutment with the components. The hex nut may then be turned which will cause the fixing head to turn, to orient the fixing head lengthwise with the slots. The tension in the spring may then be released and the fixing head passed lengthways through the slots. The assembled fixing device can be arranged with components to be connected be reversing these steps.

FIGS. 12A-C present the same views as FIGS. 11A-C of the fixing device of FIG. 10, where now the fixing device has been arranged and threaded tight with components to be connected. The hex nut 64, the end of the threaded rod 48 and the base 30 of the retaining element are indicated in FIG. 12A. FIG. 12B is a cross-sectional view taken about the section AD-AD of FIG. 12A. The hex nut 64 is now threaded tight such that the threaded rod 48 proceeds completely through the threaded bore of the hex nut, and the spring has been folded completely, or folded all the way in to the recess of the retaining element 26, such that the hex nut now abuts the base of the retaining element. The hex nut is threaded tight also so as to cause the protrusions of the retaining element and the fixing head to bite into the components. This is better represented in FIG. 12C, which is a cross-sectional view taken about the section AE-AE of FIG. 12A. It can be seen that the protrusions 38 and 78 of both the retaining element and the fixing head bite into the components and the shelves of the retaining element and the fixing head also now abut the components. It can also be seen that the elevations of both the retaining element and the fixing head fit within the width of the slots of the components and the elevations extend from the base of the fixing head and retaining element by an amount which is less than the thickness of the components to be connected.

Figure 13:
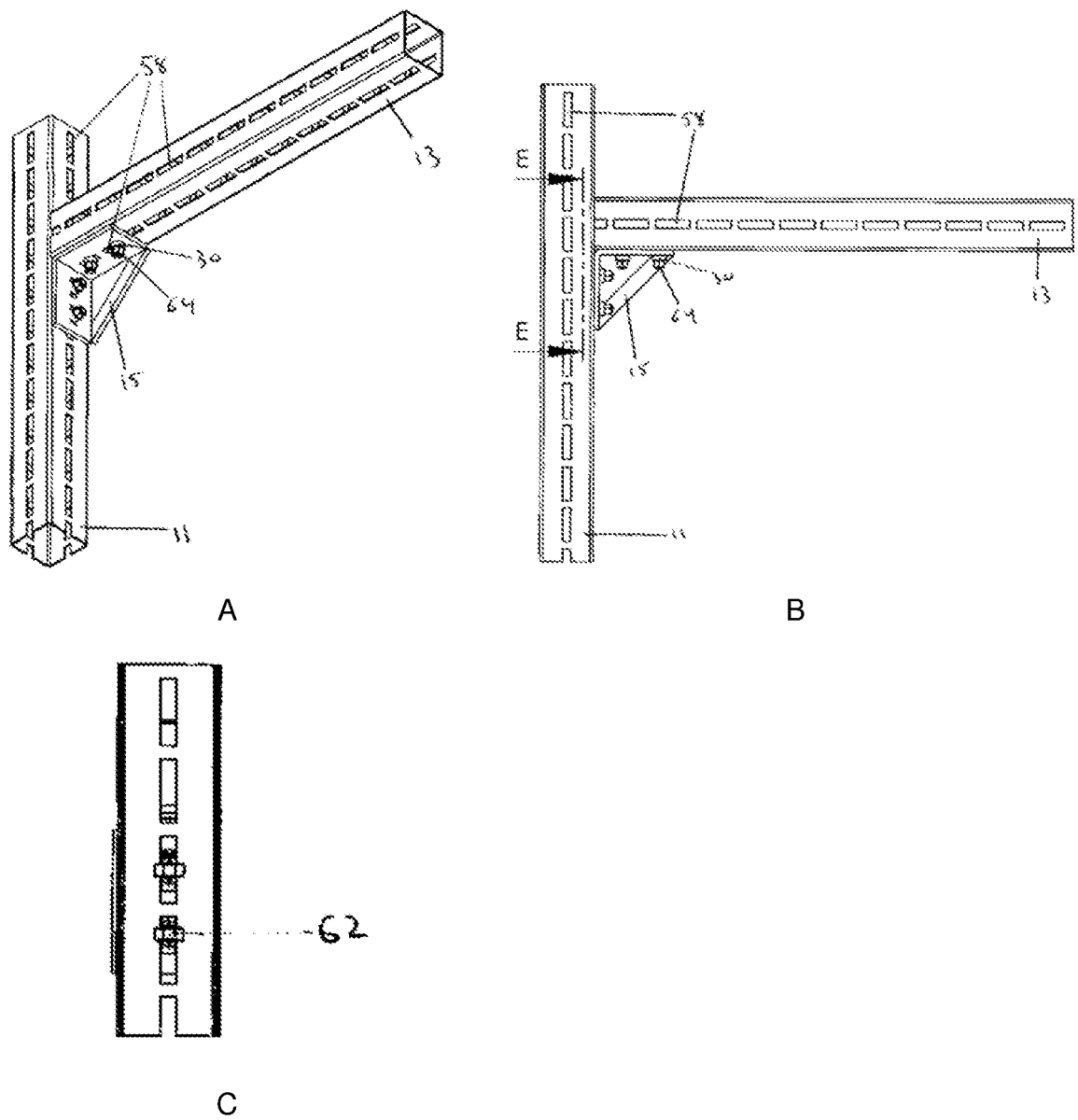
FIGS. 13A-C depict the fixing device of FIG. 10 of the present invention arranged and threaded tight with components including square profile components.

FIGS. 13A-C show the fixing device of FIG. 10 of the present invention when arranged and threaded tight with components to be connected, including square profile components 11 and 13 and an angle bracket with gusset component 15 for a steel structural support system. While an angle bracket with gusset is shown, various other components are equally applicable, including adapters, bases, ends, joints, brackets, joiners, connectors, shoes, braces and the like. The components have openings by way of slots 58. In FIGS. 13A and 13B, the hex nut 64 and base 30 of each fixing device are shown. The components are arranged between the retaining element and the fixing head (fixing head not shown) of the fixing device such that the threaded rod of each fixing device (threaded rod not shown) passes through a slot in the bracket component 15 and a slot in a square profile component 11 or 13. The hex nut is threaded tight on the threaded rod such that the hex nut abuts the base of the retaining element and the protrusions of the retaining element and the fixing head (protrusions not shown) bite into the components. FIG. 13C is a cross-sectional view taken about section E-E of FIG. 13B, and shows the fixing head 62 oriented crosswise to the slots in the components. It can generally be seen that the dimensions of the fixing head are such that it fits lengthways through the slots. Thus, before the fixing device is threaded tight, the arranging of the components may be performed with the fixing device already assembled by passing the fixing head lengthways through the slot, then turning the fixing head crosswise to the slot.

FIGS. 14-16C show an alternative fixing device 80 of the present invention. In this embodiment, neither a head nor a fixing nut is included. The fixing device in FIG. 14 includes a threaded rod 48, a biasing element 52 which is a helical compression spring, a first retaining element 26a and a second retaining element 26b. A first and second fastener, or hex nuts, are also included but not shown, at each end of the threaded rod. Two components 56 are also shown between the first and second retaining elements. The retaining elements are the same as the retaining element depicted in FIGS. 2A-E and described above, including protrusions 38, and are oriented relative to each other so that the protrusions protrude in a direction towards each other. Both retaining elements includes a recess in the body for receiving a biasing element; however this recess is not necessary in the second retaining element in this embodiment.

Figure 14:
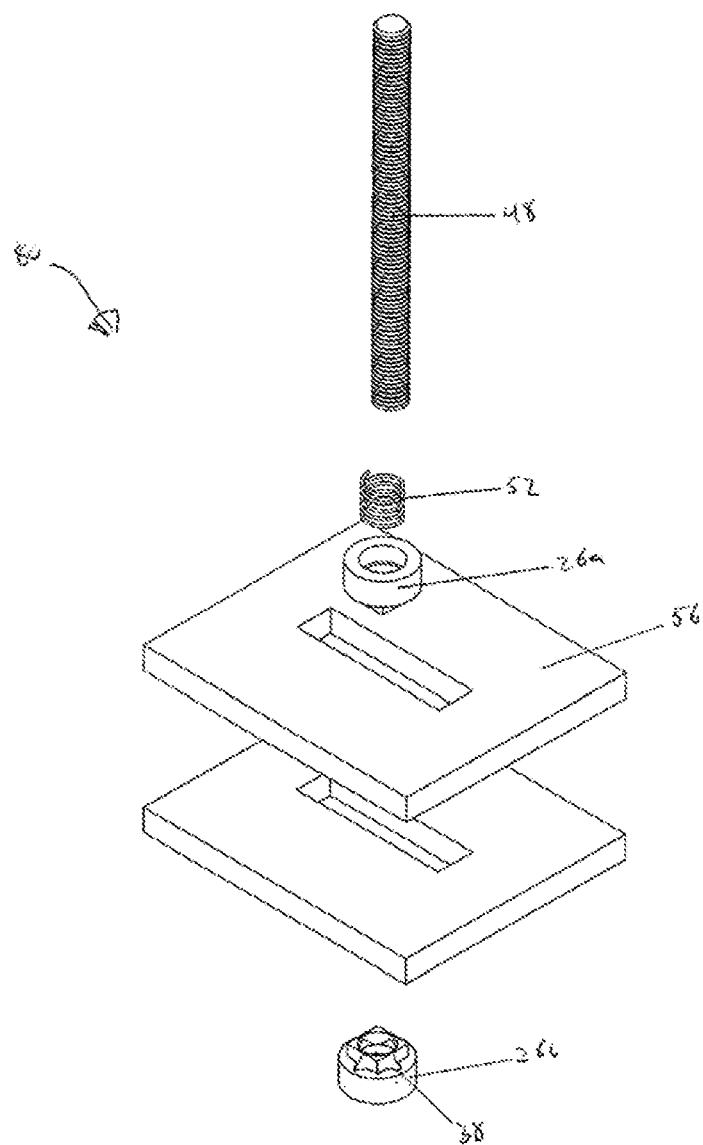
FIG. 14 is an isometric projection of an exploded view of an alternative fixing device of the present invention with components.
Figure 15:
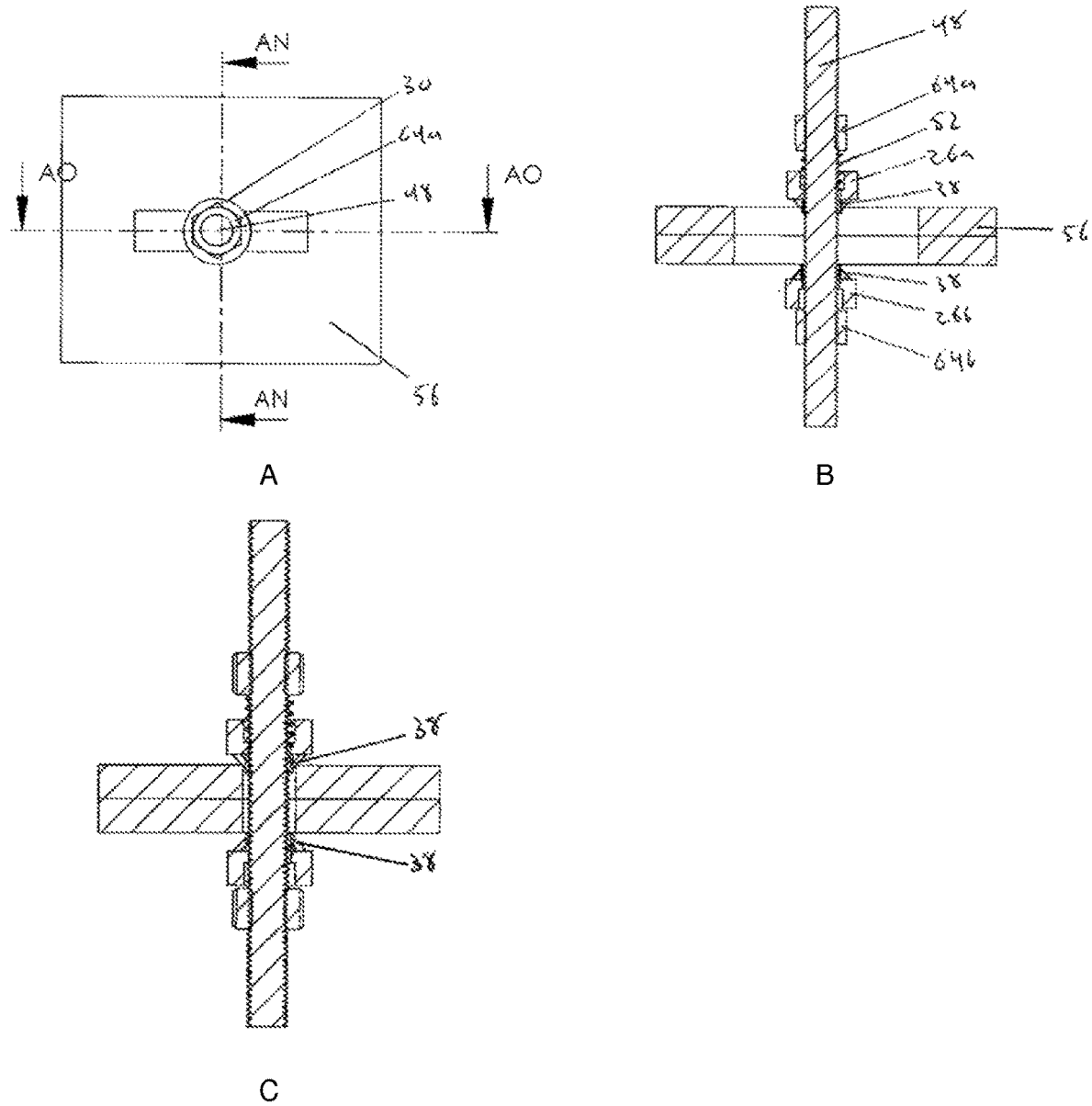
FIGS. 15A-C depict the fixing device of FIG. 14 of the present invention arranged with components.
Figure 16:
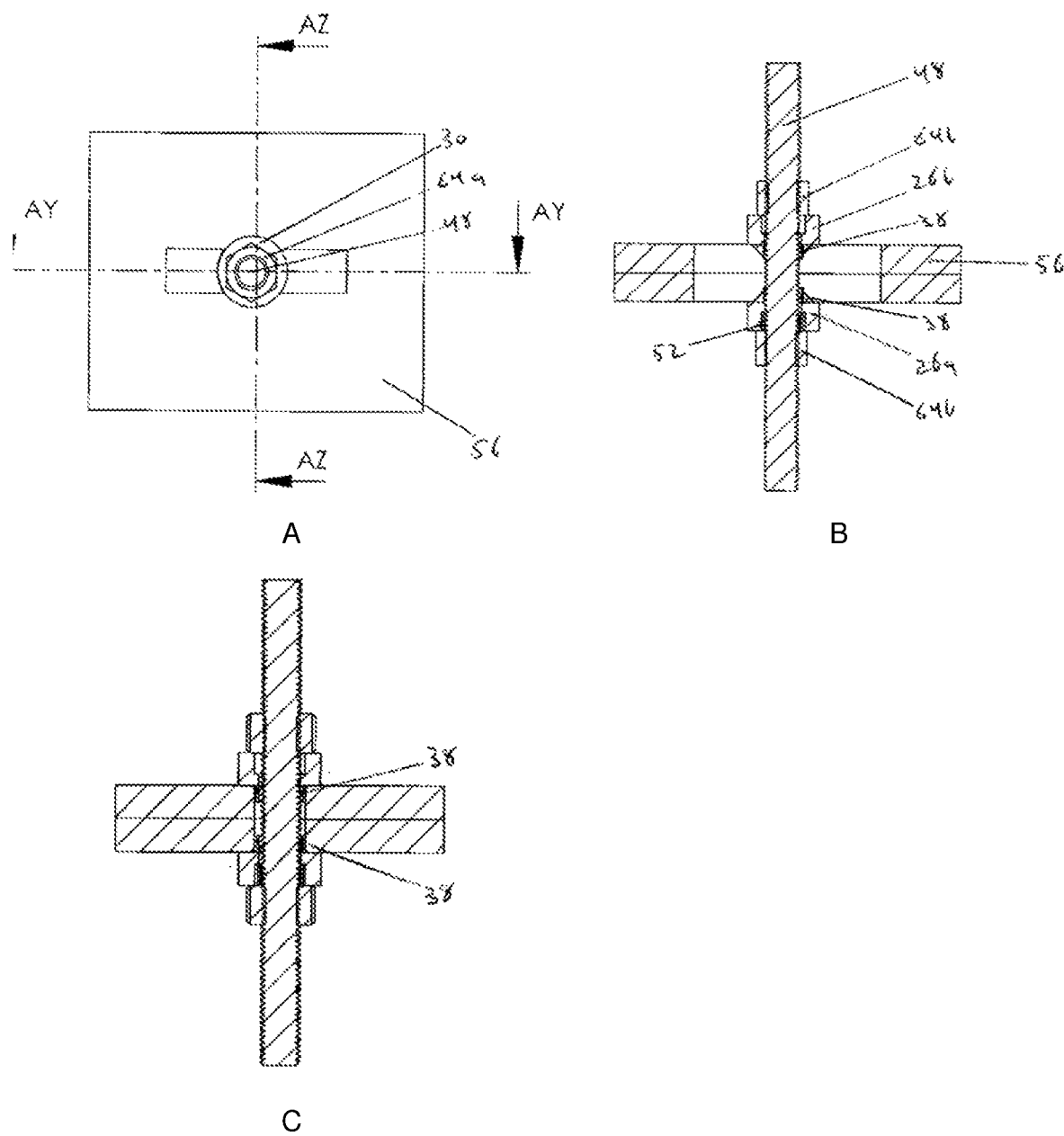
FIGS. 16A-C depict the fixing device of FIG. 14 of the present invention arranged and threaded tight with components.

In FIGS. 15A-C the fixing device 80 of FIG. 14 is shown when arranged with components 56 to be connected. FIG. 15A is a view towards the first fastener, or hex nut 64a, and the end of the threaded rod 48 and the base 30 of the first retaining element can also be seen. FIGS. 15B and 15C are cross-sectional views taken about the sections AO-AO and AN-AN of FIG. 15A, respectively, showing the retaining elements 26a and 26b positioned on the threaded rod 48 and components 56 arranged between them. The first and second fasteners, or hex nuts, 64a and 64b, respectively, are also shown. The hex nuts are threaded onto the threaded rod but have not been threaded tight in this depiction. The spring 52 abuts the first hex nut 64a and is received in a recess of, and abuts a flange formed in, the base of the first retaining element 26a. There in tension in the spring such that it biases the first retaining element towards the second hex nut causing the protrusions 38 of the first and second retaining elements to abut the components to be connected about the periphery of the slots.

FIGS. 16A-C present the same views as FIGS. 15A-C of the fixing device of FIG. 14, where now the hex nuts have been threaded tight with the components to be connected. The first hex nut 64a, the end of the threaded rod 48 and the base 30 of the first retaining element are indicated in FIG. 16A. FIG. 16B is a cross-sectional view taken about the section AY-AY of FIG. 16A. The hex nuts 64a and 64b are now threaded tight such that the spring 52 has been folded completely, or folded all the way in to the recess of the first retaining element 26a, and the first hex nut 64a now abuts the base of the first retaining element. The protrusions of the first and second retaining element bite into the components. This is better represented in FIG. 16C, which is a cross-sectional view taken about the section AZ-AZ of FIG. 16A. It can be seen that the protrusions 38 of both the first and second retaining elements 26a and 26b bite into the components and the shelves of the retaining elements also now abut the components. It can also be seen that the elevations of both the retaining elements fit within the width of the slots of the components and the elevations extend from the base of the retaining elements by an amount which is less than the thickness of the components to be connected.

It is to be understood that various alterations, modifications and/or additions may be made without departing from the spirit of the present invention as outlined herein.

As used herein, except where the context requires otherwise, the term "comprise" and variations of the term, such as "comprising", "comprises" and "comprised", are not intended to be in any way limiting or to exclude further additives, components, integers or steps.

Reference to any prior art in the specification is not, and should not be taken as, an acknowledgment or any form of suggestion that this prior art forms part of the common general knowledge in Australia or any other jurisdiction or that this prior art could reasonably be expected to be ascertained, understood and/or regarded as relevant by a person skilled in the art.

The claims defining the invention are as follows:

1. A fixing device for connecting components, said fixing device including:
   a threaded rod optionally having a head,
   one or more fasteners, wherein one fastener is a fixing nut including one or more protrusions for biting into a component,
   a retaining element, and
   a biasing element;
   wherein the retaining element is positioned on the threaded rod between the head or a fastener and the fixing nut, and wherein the biasing element is configured to bias the retaining element towards the fixing nut.

2. A fixing device according to claim 1, wherein the biasing element abuts the retaining element and the head or a fastener, and wherein the biasing element is configured to bias the retaining element towards the fixing nut which it is not in abutment.

3. A fixing device according to claim 2, wherein the threaded rod includes an integral head such that together the head and the threaded rod form a bolt.

4. A fixing device according to claim 2, wherein the fixing nut includes a threaded bore for receiving the threaded rod, a base and an elevation, wherein the elevation includes one or more sidewalls extending from the base, the threaded bore is formed through both the base and the elevation, and the base includes two shelves about opposing sides of the elevation such that the general profile of the fixing nut is substantially oblong in shape, and the general profile of the elevation is substantially square in shape, when viewed down the axis of the threaded bore.

5. A fixing device according to claim 4, wherein the one or more protrusions for biting into a component independently adjoin a shelf of a base of the fixing nut and a side wall of an elevation of the fixing nut.

6. A fixing device according to claim 5, wherein the threaded rod includes an integral hex head such that together the head and the threaded rod form a bolt.

7. A fixing device according to claim 2, wherein the retaining element includes an unthreaded bore for receiving the threaded rod, a base and an elevation, wherein the elevation includes one or more sidewalls extending from the base, the unthreaded bore is formed through both the base and the elevation, and the base includes one shelf about substantially all around the elevation such that the general profile of the elevation is substantially square in shape when viewed down the axis of the unthreaded bore.

8. A fixing device according to claim 7, wherein the biasing element is a spring, wherein the retaining element includes a recess for receiving the biasing element, the recess forms a flange about the periphery of the unthreaded bore, and the biasing element abuts the flange and the head or a fastener.

9. A fixing device according to claim 8, wherein the retaining element includes one or more protrusions for biting into a component.

10. A fixing device according to claim 9, wherein the retaining element includes four protrusions, one each adjoining a side wall of the elevation and the shelf of the base.

11. A method for connecting components using the fixing device according to claim 1, said method including the step of arranging the components between the retaining element and the fixing nut, such that the biasing element causes the retaining element and the fixing nut to abut the components.

12. A method for connecting components according to claim 11, wherein the retaining element optionally includes protrusions for biting into a component, and including the additional step of applying a torsional force to the head or a fastener, wherein sufficient torsional force is applied to cause the protrusions of the retaining element and of the fixing nut to bite into the components.

13. A method for connecting components according to claim 12, wherein the fixing device includes is a hex head, and the torsional force is applied to the head.

14. A method for connecting components according to claim 11, wherein one or more of the components includes a sheet material including an opening for receiving the threaded rod, wherein the opening is a slot, and wherein the fixing nut is substantially oblong in shape when viewed down the axis of its threaded bore, and the arranging includes passing the fixing nut lengthways through a slot in the components then turning it crosswise to the slot.

15. A fixing nut for use with a fixing device according to claim 1, wherein the fixing nut includes one or more protrusions for biting into a component.

* * * * *